US012654810B2

(12) United States Patent
Joensen et al.

(10) Patent No.: US 12,654,810 B2
(45) Date of Patent: Jun. 16, 2026

(54) PULLING STRUCTURES INTO WATER

(71) Applicant: Subsea 7 Limited, Sutton (GB)

(72) Inventors: Arnbjorn Joensen, Aberdeen (GB);
Nwabueze Samuel Ogbodo, Kingseat
Newmachar (GB)

(73) Assignee: SUBSEA 7 LIMITED, Sutton (GB)

( * ) Notice: Subject to any disclaimer, the term of this
patent is extended or adjusted under 35
U.S.C. 154(b) by 595 days.

(21) Appl. No.: 17/922,158

(22) PCT Filed: Apr. 28, 2021

(86) PCT No.: PCT/GB2021/051026
§ 371 (c)(1),
(2) Date: Oct. 28, 2022

(87) PCT Pub. No.: WO2021/219998
PCT Pub. Date: Nov. 4, 2021

(65) Prior Publication Data
US 2023/0182868 A1 Jun. 15, 2023

(30) Foreign Application Priority Data
Apr. 29, 2020 (GB) ...................................... 2006315

(51) Int. Cl.
*B63B 21/66* (2006.01)
*B63B 15/00* (2006.01)
(Continued)

(52) U.S. Cl.
CPC .......... *B63B 21/66* (2013.01); *B63B 15/0083*
(2013.01); *B63B 21/00* (2013.01);
(Continued)

(58) Field of Classification Search
CPC ......... B63B 21/00; B63B 21/62; B63B 21/66;
B63B 21/56; B63B 21/50; B63B 15/0083;
(Continued)

(56) References Cited

U.S. PATENT DOCUMENTS

| | | | | |
|---|---|---|---|---|
| 4,107,933 A | * | 8/1978 | Lamy | F16L 1/14 |
| | | | | 405/172 |
| 4,363,566 A | * | 12/1982 | Morton | F16L 1/165 |
| | | | | 405/172 |

(Continued)

FOREIGN PATENT DOCUMENTS

| | | |
|---|---|---|
| DE | 406601 | 11/1924 |
| EP | 0 064 398 | 11/1982 |

(Continued)

*Primary Examiner* — Lars A Olson
(74) *Attorney, Agent, or Firm* — MATTINGLY &
MALUR, PC

(57) ABSTRACT

A structure such as a pipeline bundle is pulled into or
through shallow water, for example, when launching the
structure, by applying a tensile pulling force to the structure
through rigging that extends to the structure from a winch of
a first vessel. The pulling force is at least partially reacted
through a pennant line that extends from the first vessel to
a second vessel and that hangs between the first and second
vessels to engage the seabed soil frictionally. The vessels
can also self-propel to contribute their thrust to the pulling
force. The pennant line includes a clump weight such as a
bundle of chains that can be repositioned easily for addi-
tional pulls by being lifted between the vessels before being
lowered to the seabed at a new location.

29 Claims, 4 Drawing Sheets

(51) Int. Cl.

| | | |
|---|---|---|
| *B63B 21/00* | (2006.01) | |
| *B63B 21/50* | (2006.01) | |
| *B63B 21/56* | (2006.01) | |
| *B63B 21/62* | (2006.01) | |
| *B63H 9/061* | (2020.01) | |
| *F16L 1/16* | (2006.01) | |

(52) U.S. Cl.
CPC .............. *B63B 21/50* (2013.01); *B63B 21/56* (2013.01); *B63B 21/62* (2013.01); *B63H 9/061* (2020.02); *F16L 1/165* (2013.01)

(58) Field of Classification Search
CPC ... F16L 1/00; F16L 1/165; B63H 9/00; B63H 9/061
USPC ......................................................... 114/244
See application file for complete search history.

(56) References Cited

U.S. PATENT DOCUMENTS

| | | | |
|---|---|---|---|
| 4,474,507 A | 10/1984 | Morton | |
| 6,122,847 A | 9/2000 | Treu et al. | |
| 10,753,509 B2 * | 8/2020 | Landwehr | ............... B63B 21/66 |

FOREIGN PATENT DOCUMENTS

| | | |
|---|---|---|
| GB | 7904 | 9/1909 |
| GB | 1 434 357 | 5/1976 |
| GB | 2574893 | 12/2019 |
| JP | 2005-121077 | 5/2005 |
| KR | 1020140065046 | 5/2014 |
| KR | 1020200001828 | 1/2020 |
| RU | 2 707 479 | 11/2019 |

* cited by examiner

PULLING STRUCTURES INTO WATER

This invention relates to pulling large products or structures from land into a body of water, as may be required after fabricating a structure on land before its use or installation offshore.

It is routine in the field of offshore engineering to assemble or build structures on land before transferring them into water. For example, towable platform jackets or pipeline bundles for use in the subsea oil and gas industry are typically fabricated at a coastal yard or spoolbase. Once complete, the structure is pulled or towed across the shore and into the adjoining sea, usually by one or more tugs stationed close to the shore.

To minimise stress on the structure during launching, it is desirable to fabricate the structure at a location where the seabed slopes only shallowly away from the shore. The structure may therefore have to be pulled a considerable distance before it can float clear of the seabed.

Towing a structure into and across the sea involves connecting an end of the structure to at least one lead tug and pulling the structure by the bollard pull force generated by propellers of the tug. Where the structure is elongate, as exemplified by the pipeline bundle of U.S. Pat. No. 4,474, 507, one or more trailing tugs may be used to support or guide an opposite end of the structure.

Once the structure is fully in deep water and is held clear of the seabed by buoyancy, bollard pull can move the structure relatively easily. Before that, however, bollard pull must overcome resistance to movement of the structure due to its interaction with the underlying land and/or seabed, particularly frictional forces.

It will be apparent that a tug used to pull a structure into the sea will be in shallow water when bollard pull must be at its greatest, namely when the structure is still at or close to the shore. This presents a problem because tugs cannot operate most effectively in shallow water, for example less than about 10 m deep. In such shallow water, the bollard pull available for towing a structure is reduced because the propellers of the tug disturb the seabed soil and so cannot deliver full power.

To increase the bollard pull capacity, two or more tugs can be combined in series or parallel as shown in KR 20140065046. When used in shallow water, multiple tugs will still suffer from power loss but the aggregation of their available bollard pull compensates for that loss. However, this solution suffers from the disadvantage of much greater expense, both in operating cost and tie-up of valuable capital assets.

The alternative of using a more powerful tug also adds cost and is not an effective solution because, in general, more powerful tugs require deeper water to operate efficiently.

In view of these challenges, the conventional solution to the problem of pulling a structure in shallow water is to anchor a tug or a barge with drag anchors and then to pull the structure using a winch aboard the tug or barge. A drawback of this solution is that anchoring is time-consuming: the anchors have to be installed and removed each time the structure is advanced into the sea in a stepwise manner. Another approach for very large structures is to anchor a tug or barge with fixed piles but piles are even more time-consuming and expensive to install and to remove.

A variant of the anchoring approach, known in the art as 'walking on anchors', is described in KR 20130066014. This involves pulling the structure using a winch and pulling on multiple mooring lines while recovering and moving their associated anchors in sequence. However, this technique is also time-consuming and is complex to perform.

GB 1434357 discloses a method of constructing a pipeline on the floor of a body of water that subjects a section of pipeline to a tensile force while being transported to its destination for connection to the existing length of pipeline.

JP 2005/121077 details a method for laying pipe bodies by towing the pipe bodies out to sea using a tug-boat that uses a GPS system to determine its position.

GB 2574893 describes a method and apparatus for applying buoyant upthrust to an elongate subsea structure. A buoyancy unit is provided that can be flooded with water to affect the buoyancy upthrust provided, allowing mid-water towing of the elongate subsea structure.

Time is a precious commodity in the field of offshore engineering. As noted above, vessels are valuable capital assets that have high operating costs proportionate to the time taken to complete the launching operation. Also, the time available to launch a structure may be limited to a narrow window of calm weather. If that window is missed, a larger project dependent on that structure could be delayed significantly, potentially at enormous cost.

Against this background, the invention may be expressed as a method of pulling a structure into or through water, the method comprising: applying a tensile pulling force to the structure through rigging that extends to the structure from a first vessel, for example by using a winch aboard the first vessel that acts on the rigging; and reacting that pulling force through a pennant line that extends from the first vessel to a second vessel and that frictionally engages seabed soil between the first and second vessels. In the context of this technical field and the invention described below, it will be appreciated that a pennant line is exemplified by a cable and/or chain that extends between and hangs from the first and second vessels.

The invention is apt to be used when pulling the structure across a shore and into water. In that case, the first vessel may be a near-shore tug and the second vessel may be a far-shore tug. More generally, the first vessel may be located in shallower water than the second vessel and may hence, or otherwise, be unable to generate as much thrust or bollard pull as the second vessel.

Preferably, at least one clump weight of the pennant line is engaged with the seabed soil. The or each clump weight may, for example, comprise one or more chains that are attached to, or are in series with, the pennant line.

A central portion of the pennant line may be laid on the seabed whereas respective ends of the pennant line may be suspended from the first and second vessels between the surface and the seabed, for example in a catenary configuration.

The pulling force may also be reacted by propelling the first and/or second vessels away from the structure. For example, by propelling the second vessel away from the structure, tension may be imparted in the pennant line, movement of the pennant line toward the structure may be resisted, and the pennant line could even be moved away from the structure. As a contingency measure, movement of the pennant line toward the structure may also be resisted by engaging the seabed with an anchor of the pennant line.

The method of the invention may further comprise: relaxing the pulling force applied to the structure through the rigging; lifting the pennant line to reduce or to interrupt frictional engagement with the seabed soil; moving the first and second vessels and the pennant line away from the structure; lowering the pennant line to increase or to resume frictional engagement with the seabed soil; and reapplying the pulling force to the structure through the rigging.

Part or substantially all of the pennant line may be lifted clear of the seabed soil. At least a portion of the pennant line may be lifted onto the second vessel. The second vessel may be moved toward the first vessel for the purpose of lifting the pennant line.

Conveniently, the pennant line may be left coupled to the first and second vessels while being lifted, moved and lowered. Similarly, the rigging may be kept coupled to the structure and the first vessel while moving the first vessel away from the structure. To achieve this, the rigging may be paid out from the first vessel while moving the first vessel away from the structure. The rigging may float on water between the first vessel and the structure.

The inventive concept also embraces a corresponding pulling arrangement for pulling a structure into or through water. That arrangement comprises: first and second towing vessels disposed in series with each other and with the structure; rigging that extends to the structure from the first vessel; and a pennant line that extends from the first vessel to the second vessel and that frictionally engages seabed soil between the first and second vessels.

The rigging, which may be positively buoyant, suitably extends to the structure from a winch of the first vessel. The pennant line may be coupled to a winch of the second vessel.

The pennant line may comprise at least one clump weight and may comprise at least one contingency anchor that is arranged to bury itself into the seabed soil if the pennant line moves longitudinally toward the structure. Conversely, such an anchor may be arranged to disengage from the seabed soil if the pennant line moves longitudinally away from the structure.

The invention addresses the problem that, in shallow water, tugs are limited in the bollard pull force they can provide by propulsion alone due to limited under-keel clearance. Thus, in order to reduce the thrust that tugs have to produce to launch loads or structures, especially in shallow waters, a clump weight such as a chain can be introduced in line between near-shore and far-shore tugs used for the launch.

The chain clump weight serves as a resistance to motion for the tugs to react against. This reduces the thrust required from both tugs while enabling a greater pulling force to be exerted by an onboard winch of the near-shore tug to launch the structure.

During a launch operation in shallow water, the tugs have to be stationed far away from the land point or shore in the launch area. Consequently, a considerable length of launch wire is required, which increases launch loads. To reduce these launch loads, a pennant could be placed with a floating rope between the near-shore tug and the structure to reduce the launch force as the rigging does not touch the seabed.

By way of example, a chain clump weight may be in series with, attached to or incorporated into, an inter-ship pennant extending from a first, near-shore launch tug to a second, far-shore launch tug. An anchor may be added as a contingency against sliding.

As an example of the set-up of the tugs, the near-shore tug may be set up as close to the shore as possible in the available water depth. A winch of the near-shore tug may be connected to the structure to be launched by floating rigging extending onshore. The far-shore tug may then be connected by an inter-ship pennant to the bow of the near-shore tug, followed by a chain clump weight as described above, which is laid onto the seabed.

During a launch operation, both tugs together provide the available thrust to increase the launch capacity. The near-shore tug pulls the structure into the sea by using its winch, heaving in on the floating rigging and reacting against the chain clump weight. The far-shore tug recovers and resets the chain clump weight, periodically or continuously, as may be required to continue the launch operation.

Thus, the invention increases the pull capacity in shallow water without a commensurate increase in the number or individual power of tugs and without introducing multiple anchors or piles. The invention is more efficient than the use of fixed anchors and piles because the clump weight can be shifted quickly if required for multiple pulling steps during a launch operation. Aside from being much faster than using anchors or piles, the resistance provided by a clump weight such as a chain is easily controllable, for example by putting down more weight in the form of additional or longer or heavier chains to achieve additional resistance.

Embodiments of the invention implement a method for towing an item in shallow water, the method comprising: connecting a first tug comprising a winch to the item to tow; and deploying a pennant line between the first tug and a second tug by the second tug, wherein the pennant line is at least partially laid on the seabed and provides weight and friction sufficient for the first tug to pull the item. The pennant line may, for example, hang in a catenary configuration between the first tug and the second tug.

The method may comprise the further steps of: lifting the pennant line by the second tug; advancing the first tug while paying out the towing line; and laying down the pennant line to continue towing by the first tug.

The pennant line may comprise at least chain segments and/or clump weights. The pennant line may also comprise a contingency anchor to hold back the line in case the chain slips over the seabed toward the shore.

In summary, the invention enables a product or structure such as a pipeline bundle to be pulled into or through shallow water, for example when launching the structure, by applying a tensile pulling force to the structure through rigging that extends to the structure from a winch of a first vessel. The pulling force is at least partially reacted through a pennant line that extends from the first vessel to a second vessel and that hangs between the first and second vessels to engage the seabed soil frictionally. One or both of the vessels may also self-propel to contribute their thrust to the pulling force.

The pennant line may include a clump weight such as a bundle of chains. The pennant line can be repositioned easily for additional pulls by being lifted from the seabed, for example by being winched onto the second vessel, before being lowered to the seabed again at a new location. Conveniently, the pennant line can be lifted between the vessels while remaining coupled to the vessels.

In order that the invention may be more readily understood, reference will now be made, by way of example, to the accompanying drawings in which.

Figures 1, 2:
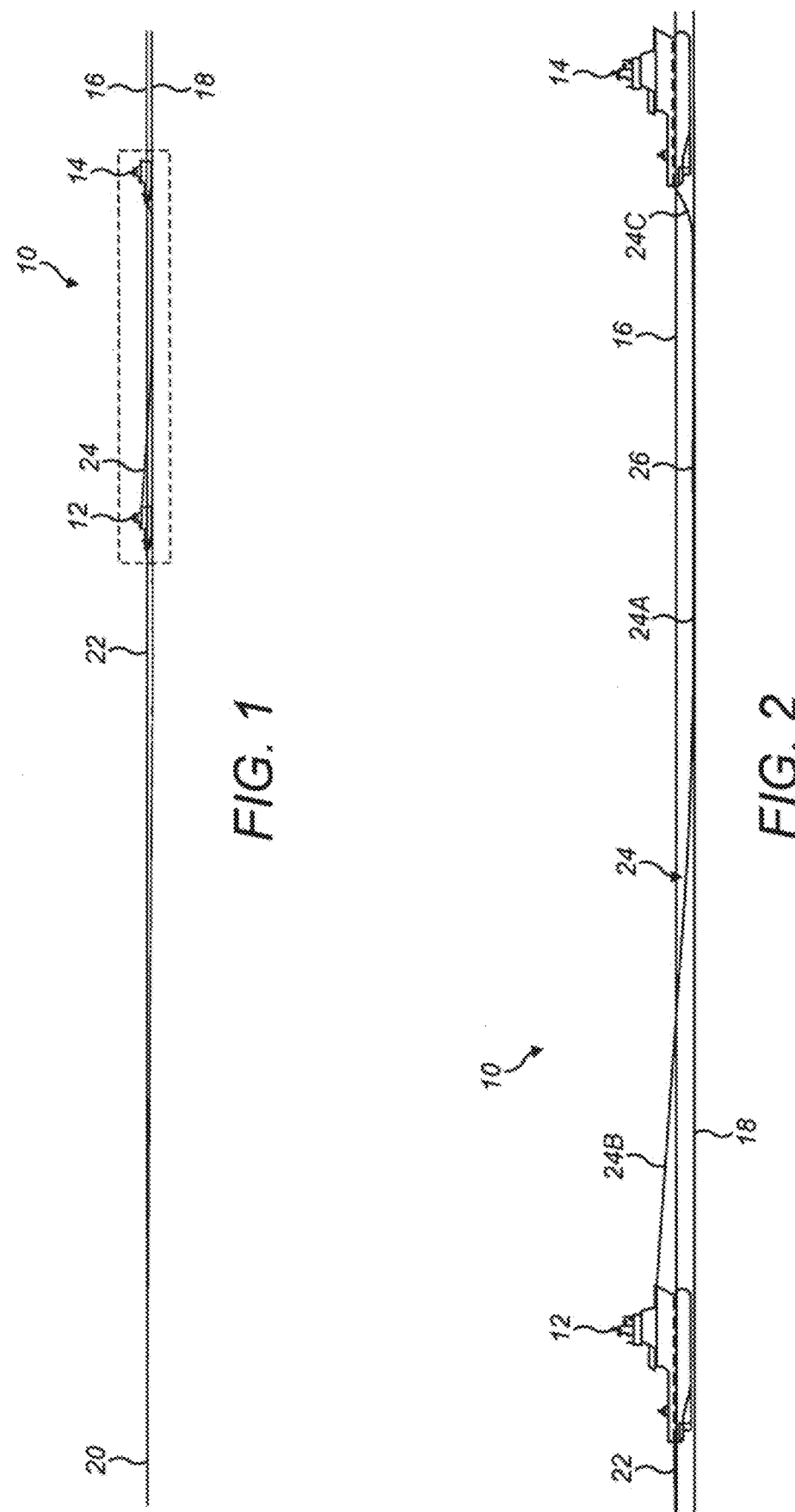
FIG. 1 is a schematic side view of a pulling arrangement of the invention, comprising near-shore and far-shore tugs stationed in shallow water close to the shore and connected in series by an inter-ship pennant laid partially on the seabed.
FIG. 2 is an enlarged view corresponding to Detail II of FIG. 1.
Figures 3, 4:
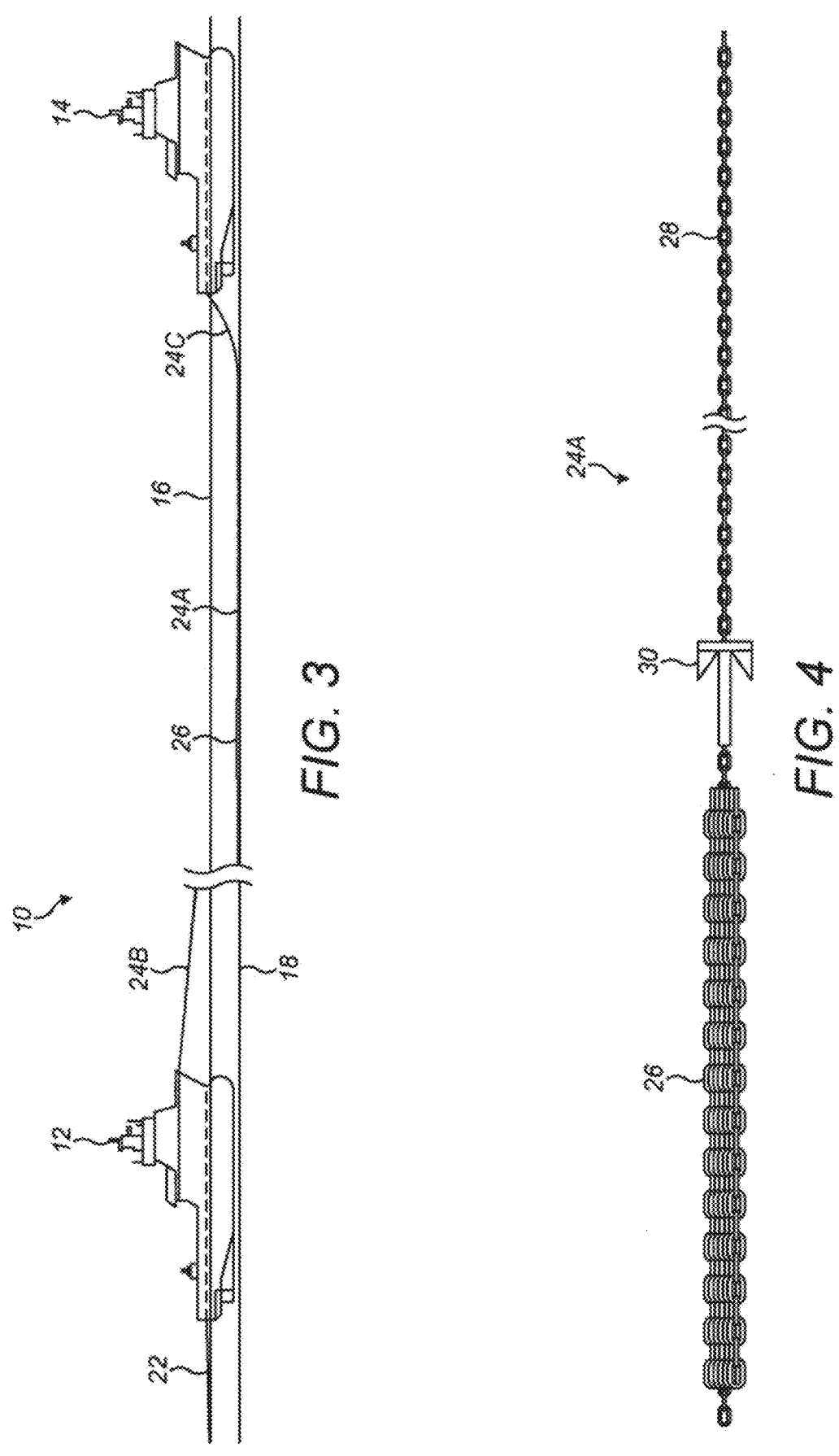
FIG. 3 is a further enlarged view of the tugs and the inter-ship pennant shown in FIG. 2.
FIG. 4 is a plan view of a portion of the inter-ship pennant shown in FIGS. 1 to 3, including a chain clump weight and an optional contingency anchor.

Referring firstly to FIGS. 1 to 3 of the drawings, a pulling arrangement 10 of the invention comprises a near-shore tug 12 and a far-shore tug 14. The tugs 12, 14 float on the surface 16 of the sea in shallow water above a gently-shelving seabed 18. The tugs 12, 14 are in mutual alignment along a common heading that is substantially perpendicular to the shore 20.

The near-shore tug 12 is as close to the shore 20 as the shallowness of the water may safely allow. The tugs 12, 14 are spaced apart by several hundred metres, for example, 700 m apart. Thus, by virtue of the downward slope of the seabed 18 away from the shore 20, the far-shore tug 14 is in slightly deeper water than the near-shore tug 12. Consequently, the propellers of the near-shore tug 12 may apply somewhat less thrust than those of the far-shore-tug 14 during a launch operation.

As best seen in FIG. 3, rigging 22 extends toward the shore 20 from an aft winch of the near-shore tug 12. The rigging 22 is coupled to a structure or product such as a pipeline bundle, not shown in FIGS. 1 to 3, that is to be pulled across the shore 20 and into the sea. Preferably, as shown, the rigging 22 is positively buoyant to float clear of the seabed 18, hence reducing friction along most of its considerable length.

The tugs 12, 14 are connected in series by an inter-ship pennant 24 that extends from the bow of the near-shore tug 12 to the stern of the far-shore tug 14. Here, the pennant 24 is a cable and/or chain that extends between and hangs from the near-shore tug 12 and the far-shore tug 14. In accordance with the invention, the negatively-buoyant pennant 24 is laid partially on the seabed 18. In this example, a substantial central portion 24A of the pennant 24 lies on the seabed 18, representing approximately half of the overall length of the pennant 24. End portions 24B, 24C of the pennant 24 hang as catenaries between the respective tugs 12, 14 and the central portion 24A on the seabed 18.

A near-shore end portion 24B of the pennant 24 coupled to the near-shore tug 12 is shown here under greater tension, and hence shallower inclination, than the far-shore end portion 24C of the pennant 24 coupled to the far-shore tug 14. The increased tension in the near-shore end portion 24B of the pennant 24 is in reaction to pulling force exerted on the rigging 22 by the winch of the near-shore tug 12.

It will be apparent that applying this tension in the near-shore end portion 24B requires resistance to longitudinal movement of the central portion 24A of the pennant 24 relative to the seabed 18. For this purpose, the central portion 24A comprises an elongate clump weight 26 that engages the seabed 18 by virtue of its mass and friction. The clump weight 26 is in series with, or incorporated into, the pennant 24. Most or all of the remainder of the pennant 24 is also negatively buoyant and so contributes additional mass and friction when in contact with the seabed 18.

FIG. 4 shows the central portion 24A of the pennant 24 comprising an example of the clump weight 26. In this example, the clump weight 26 comprises six 35 m lengths of six-inch (152.4 mm) chain bundled together in parallel, together weighing approximately one hundred tonnes.

The remainder of the pennant 24, or at least the remainder of the central portion 24A, comprises a single six-inch (152.4 mm) chain 28. For example, one 150 m length of six-inch (152.4 mm) chain 28, weighing approximately seventy tonnes, leads to an aft winch/chain locker of the far-shore tug 14.

A delta flipper anchor 30, weighing approximately five tonnes, is added to the pennant 24 as a contingency against sliding across the seabed 18. The anchor 30 is incorporated into the pennant 24 at an end of the clump weight 26. The anchor 30 is oriented to have directional effect, in particular to engage with and bury itself into the seabed 18 if pulled toward the near-shore tug 12, that is, to the left as shown in FIG. 4.

FIGS. 5*a* to 5*f* show, schematically, how the pulling arrangement 10 of the invention may be used during a launch operation when pulling a structure 32 from land across the shore 20 and into the sea.

Figures 5A, 5B, 5C:
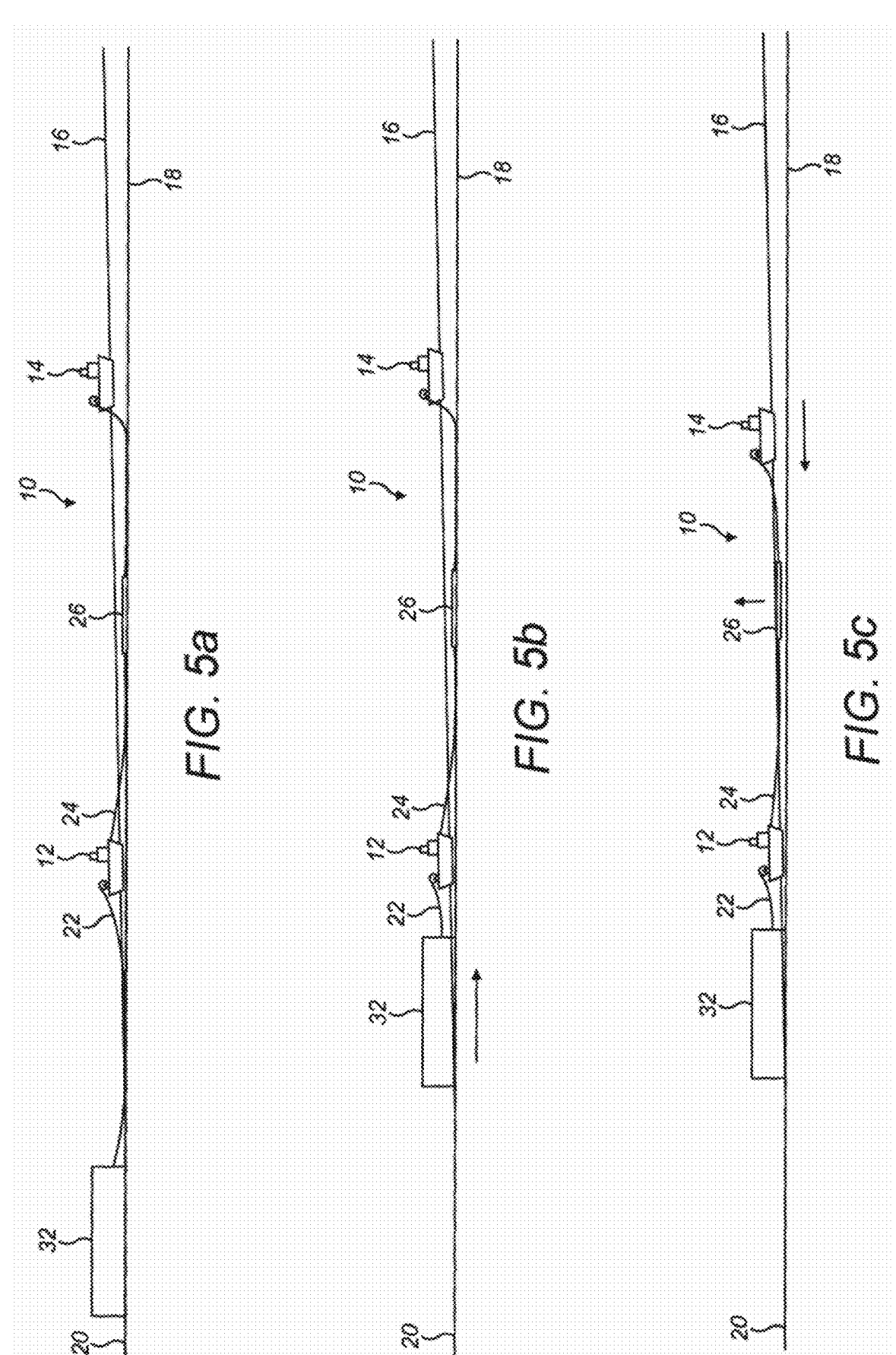
FIGS. 5*a* to 5*f* are a sequence of schematic side views that show a pulling arrangement of the invention during a launch operation when pulling a structure from land across the shore and into the sea.

In FIG. 5*a*, the near-shore tug 12 is positioned as close as possible to the shore 20 in readiness for the launch operation to begin. For this purpose, rigging 22 extends between an aft winch of the near-shore tug 12 and the structure 32. In accordance with the invention, the tugs 12, 14 are connected in series by the inter-ship pennant 24 comprising the clump weight 26, which is laid on the seabed 18. The pennant 24 extends from the bow of the near-shore tug 12 to an aft winch of the far-shore tug 14 and hangs as a catenary between the tugs 12, 14 and the seabed 18.

FIG. 5*b* shows the start of the launch operation. Reacting against frictional engagement with the seabed 18 of the pennant 24 including the clump weight 26, the winch of the near-shore tug 12 applies tension to the rigging 22 to pull the structure 32 across the shore 20 toward the sea.

The near-shore tug 12 may also apply thrust through its propellers to propel itself away from the shore 20 in reaction to the pulling force that its winch exerts on the rigging 22. Whilst the contribution of this thrust is limited by the shallowness of the water under the near-shore tug 12, the supplemental reaction force conferred by tension in the pennant 24 between the near-shore tug 12 and the clump weight 26 allows the winch of the near-shore tug 12 to apply additional tension to the rigging 22.

Thus, the tension in the rigging 22 that applies pulling force to the structure 22 is determined by the aggregate of tension in the pennant 24 and self-propulsion of the near-shore tug 12. Consequently, the supplemental reaction force attributed to tension in the pennant 24 reduces the thrust required from the propellers of the near-shore tug 12 to apply a given pulling force to the structure 32 via the rigging 22.

The frictional resistance to movement of the pennant 24 relative to the seabed 18, due largely to the mass of the pennant 24 including the clump weight 26, may be supplemented by engagement of the anchor 30 shown in FIG. 4 with the seabed 18. Specifically, if the pennant 24 starts to slip across the seabed 18 toward the shore 20, the anchor 30 will tend to bury itself in the seabed 18 to arrest that slippage. This resists movement of the pennant 24, and hence of the near-shore tug 12, relative to the seabed 18 in consequence of tension applied to the rigging 22.

The far-shore tug 14 may also apply thrust through its propellers to propel itself away from the shore 20, hence to apply tension to the pennant 24 in a direction away from the shore 20. That tension may further resist slippage of the pennant 24, and hence of the near-shore tug 12, relative to the seabed 18 toward the shore 20 in response to tension applied to the rigging 22.

Tension applied to the pennant 24 by any such thrust of the far-shore tug 14 need only be sufficient for the pennant 24 including the clump weight 26 to hold station, that is, to remain substantially stationary relative to the seabed 18 despite tension applied to the rigging 22 by the winch of the near-shore tug 12.

In this example, when the structure 32 has begun to enter the sea as shown in FIG. 5b, the winch of the near-shore tug 12 has pulled in the rigging 22 to the extent that the tugs 12, 14 must be repositioned to respective stations further from the shore 20 for a second pull to continue or to complete the launching operation. FIG. 5c shows that the launching operation is paused for this purpose while the clump weight 26 is lifted temporarily from the seabed 18 by the winch of the far-shore tug 14.

It will be apparent that, by virtue of its directional operation and orientation, the anchor 30 will not resist the clump weight 26 and the rest of the pennant 24 being lifted from the seabed 18 by the winch of the far-shore tug 14. To the contrary, if engaged with the seabed 18, the anchor 30 will be disengaged from the seabed 18 as the winch of the far-shore tug 14 pulls on the pennant 24.

When being lifted and moved, the clump weight 26 may be suspended as part of the pennant 24 held in tension between the tugs 12, 14, as shown, or may be pulled on board the far-shore tug 14 before being deployed back to the seabed 18. Constructing the clump weight 26 from one or more chains makes the clump weight 26 easy to lift in shallow water and for the far-shore tug 14 to handle. Further to ease lifting of the clump weight 26, the far-shore tug 14 may temporarily advance toward the shore 20 to close the distance to the near-shore tug 12 as shown in FIG. 5c.

Figures 5D, 5E, 5F:
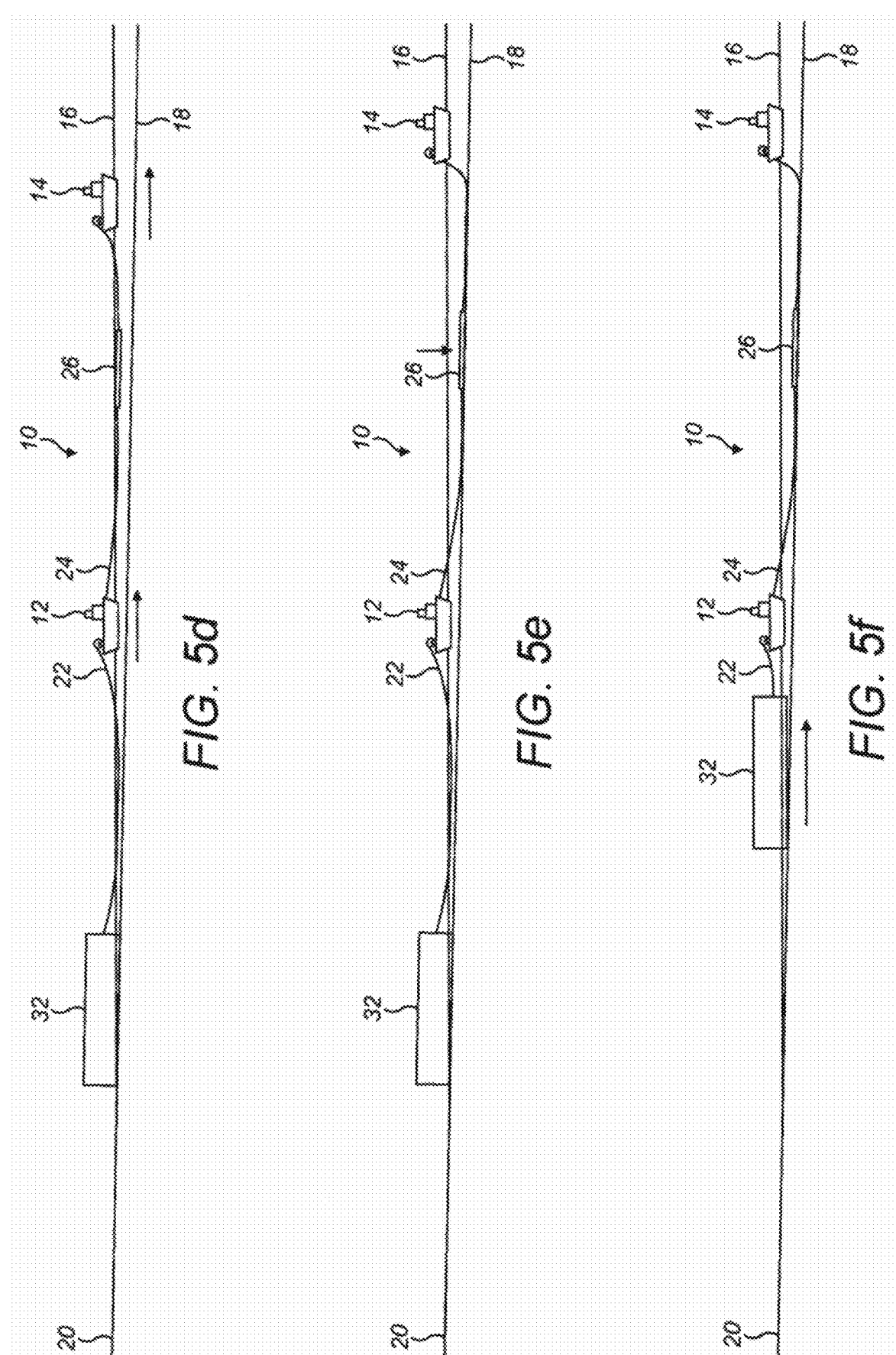

FIG. 5d shows the near-shore tug 12 repositioned further from the shore 20 and the structure 32 after paying out the rigging 22 to accommodate the increasing distance between itself and the structure 32. Advantageously, the positively-buoyant rigging 22 floats on the surface 16 as shown to avoid frictional resistance from the seabed 18.

The clump weight 26 is then lowered back to the seabed 18 further from the shore 20 as shown in FIG. 5e. Resistance to movement of the clump weight 26 relative to the seabed 18 is then available to react against tension in the rigging 22 during a second pull as shown in FIG. 5f. Again, either or both of the tugs 12, 14 may apply self-propulsive force by directing their propellers toward the shore 20 during the second pull.

In this example, the structure 32 is fully in the water at the end of the second pull as shown in FIG. 5f. The structure 32 is then held clear of the seabed 18 by its buoyancy and so is relatively easy to move away from the shore 20 without further recourse to the invention, potentially using only one of the tugs 12, 14. However, the pulling arrangement 10 of the invention could continue to be used to pull the structure 32 further from the shore 20 if desired.

Many other variations are possible within the inventive concept. For example, the far-shore tug 14 could, in principle, apply sufficient thrust to drag the pennant 24 including the clump weight 26 across the seabed 18 away from the shore 20 while the winch of the near-shore tug 12 continues to apply tension to the rigging 22. In this way, the thrust of the far-shore tug 14 could contribute to the aggregate reaction force opposed to tension in the rigging 22, thus allowing a further increase in the pulling force that can be applied to the structure 32 by the winch of the near-shore tug 12.

Consequently, the launching operation does not necessarily have to be paused to allow the tugs 12, 14 to be repositioned before an additional pull. It would instead be possible for the tugs 12, 14 to move continuously away from the shore 20 in unison to continue pulling the structure 32 into the water. When doing so, the tugs 12, 14 will balance tension in the rigging 22 against their aggregate thrust, reacting against resistance to movement of the pennant 24 including the clump weight 26.

Even if the launching operation is paused to allow the positions of the tugs 12, 14 to be reset, the clump weight 26 need not be lifted completely clear of the seabed 18. The clump weight 26 need only be lifted to the extent that the far-shore tug 14 can overcome resistance of the clump weight 26 to being dragged across the seabed 18 away from the shore 20.

In a broad sense, the invention could be used not only to pull a load from land into water but also across a body of water. Thus, the invention could involve at least one first tug and at least one second tug in series with the first tug, the or each first tug being disposed between the load and the or each second tug.

There could be at least one additional tug in series with the first and second tugs, with an additional pennant line lying on the seabed between the additional tug and the second tug.

The invention claimed is:

1. A method of launching a structure across a shore and into water, the method comprising:

applying a tensile pulling force to the structure through rigging that extends to the structure from a near-shore tug; and reacting the pulling force through a pennant line that extends from the near-shore tug to a far-shore tug and that frictionally engages seabed soil between the near-shore tug and the far-shore tug to augment the tensile pulling force and resist motion of the near-shore tug towards the shore, wherein the near-shore tug is located intermediate the far-shore tug and the structure.

2. The method of claim 1, comprising frictionally engaging the seabed soil with at least one clump weight of the pennant line.

3. The method of claim 2, wherein the or each clump weight comprises two or more chains attached to, or in series with, the pennant line.

4. The method of claim 1, comprising also reacting the pulling force by propelling the near-shore tug and/or the far-shore tug away from the structure.

5. The method of claim 4, comprising imparting tension in the pennant line by propelling the far-shore tug away from the structure.

6. The method of claim 5, comprising resisting movement of the pennant line toward the structure by propelling the far-shore tug away from the structure.

7. The method of claim 6, comprising moving the pennant line away from the structure by propelling the far-shore tug away from the structure.

8. The method of claim 1, comprising resisting movement of the pennant line toward the structure by engaging the seabed with an anchor of the pennant line.

9. The method of claim 1, comprising operating a winch aboard the near-shore tug to apply the pulling force to the structure.

10. The method of claim 1, further comprising:

relaxing the pulling force applied to the structure through the rigging;

lifting the pennant line to reduce or to interrupt frictional engagement with the seabed soil;

moving the near-shore tug, the far-shore tug and the pennant line away from the structure;

lowering the pennant line to increase or to resume frictional engagement with the seabed soil; and reapplying the pulling force to the structure through the rigging.

11. The method of claim 10, comprising lifting substantially all of the pennant line clear of the seabed soil.

12. The method of claim 10, comprising lifting at least a portion of the pennant line onto the far-shore tug.

13. The method of claim 12, comprising moving the far-shore tug toward the near-shore tug for lifting the pennant line.

14. The method of claim 10, comprising keeping the pennant line coupled to near-shore tug and the far-shore tug while lifting, moving and lowering the pennant line.

15. The method of claim 10, comprising paying out the rigging from the near-shore tug while moving the near-shore tug away from the structure.

16. The method of claim 10, comprising keeping the rigging coupled to the structure and the near-shore tug while moving the near-shore tug away from the structure.

17. The method of claim 1, comprising floating the rigging on water between the near-shore tug and the structure.

18. The method of claim 1, comprising suspending respective ends of the pennant line from the near-shore tug and the far-shore tug in a catenary configuration.

19. The method of claim 1, wherein the near-shore tug is located in shallower water than the far-shore tug.

20. A pulling arrangement for launching a structure across a shore and into water, the arrangement, in use, comprising:

a structure to be launched;

a near-shore tug and a far-shore tug disposed in series with each other and with the structure, the near-shore tug being located intermediate the far-shore tug and the structure;

rigging that extends to the structure from the near-shore tug; and a pennant line that extends from the near-shore tug to the far-shore tug and that frictionally engages seabed soil between the near-shore tug and the far-shore tug in order to augment a tensile pulling force applied by the near-shore tug to the structure to be launched and to resist motion of the near-shore tug towards the shore.

21. The arrangement of claim 20, wherein the rigging extends to the structure from a winch of the near-shore tug.

22. The arrangement of claim 20, wherein the pennant line comprises at least one clump weight.

23. The arrangement of claim 22, wherein the or each clump weight comprises two or more chains attached to, or in series with, the pennant line.

24. The arrangement of claim 20, wherein the pennant line comprises at least one contingency anchor that is arranged to bury itself into the seabed soil in the event of longitudinal movement of the pennant line toward the structure.

25. The arrangement of claim 24, wherein the or each contingency anchor is arranged to disengage from the seabed soil in the event of longitudinal movement of the pennant line away from the structure.

26. The arrangement of claim 20, wherein the pennant line is coupled to a winch of the far-shore tug.

27. The arrangement of claim 20, wherein the rigging is positively buoyant.

28. The arrangement of claim 20, wherein the near-shore tug is located in shallower water than the far-shore tug, in use.

29. The arrangement of claim 20, wherein the structure is at a shore location, in use, the near-shore tug is a near shore tug and the far-shore tug is a far shore tug.

* * * * *